April 28, 1953 C. E. SWENSON 2,636,584
SPRING TYPE ONE-WAY CLUTCH
Filed April 26, 1951
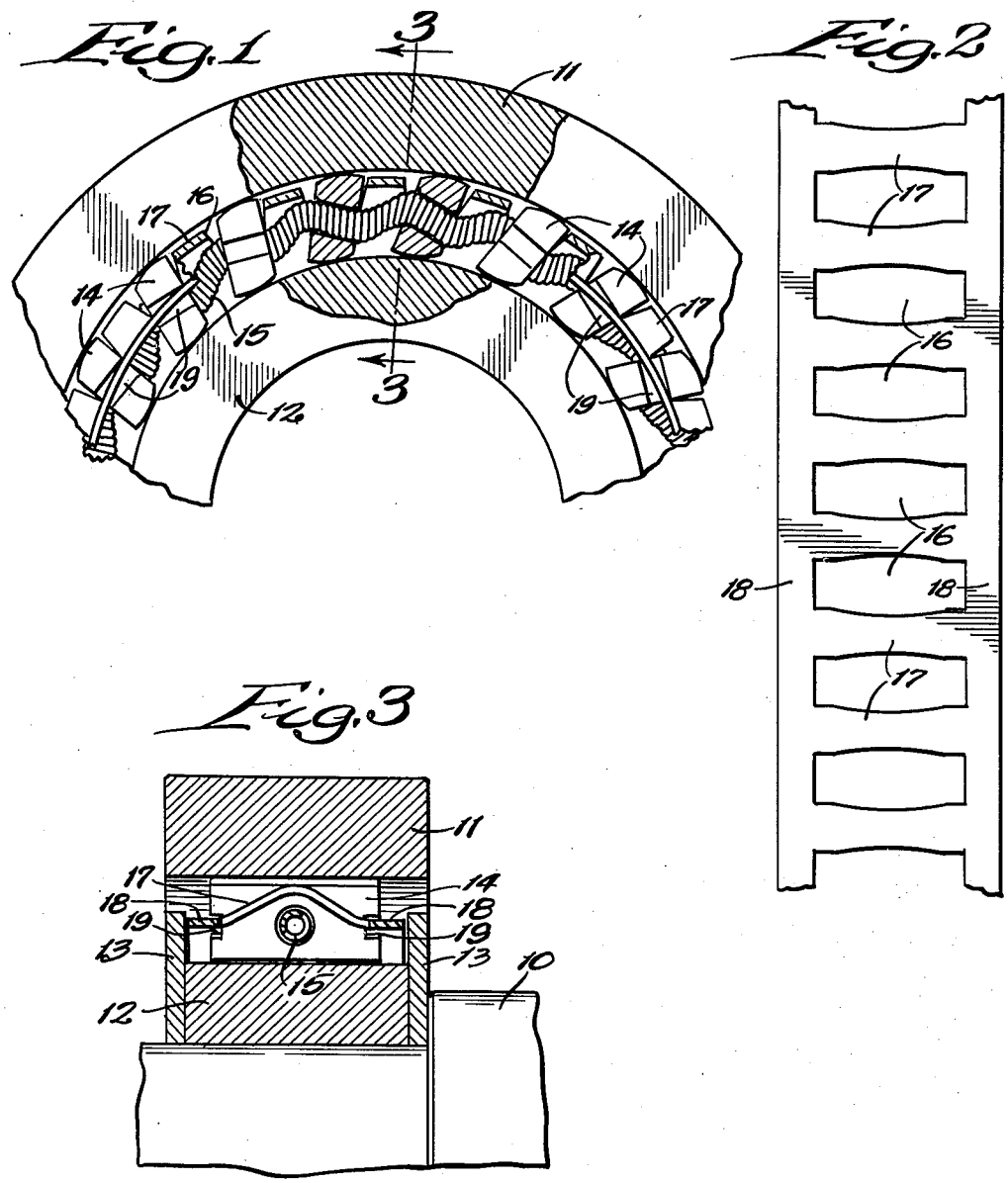
INVENTOR:
Carl E. Swenson,
BY
E. A. Booth
ATTORNEY.

Patented Apr. 28, 1953

2,636,584

UNITED STATES PATENT OFFICE 2,636,584

SPRING TYPE ONE-WAY CLUTCH

Carl E. Swenson, Rockford, Ill.

Application April 26, 1951, Serial No. 223,039

5 Claims. (Cl. 192—45.1)

1

This invention relates to one-way clutches, and more particularly to a one-way clutch assembly of the tilting gripper type.

In one-way clutches of the tilting gripper type it is desirable to provide a cage to hold the grippers properly spaced and assembled to control or limit tilting thereof and to protect the spring to prevent damage due to handling or to excessive tilting of the grippers in operation. It is one of the objects of the present invention to provide a one-way clutch, including a cage capable of performing these functions, and which is extremely simple and inexpensive in construction and compact and light in weight.

Another object is to provide a one-way clutch in which the cage is formed of a single strip of relatively thin material such as metal.

Still another object is to provide a one-way clutch in which the grippers can easily be assembled in the cage and will be held assembled therein without the use of separate fastening units.

According to one feature of the invention the cage is formed with bowed cross-pieces which are bent to draw the edge portions of the cage strip into grooves in the ends of the grippers to hold the grippers assembled and to assist in limiting tilting thereof. Preferably the cross-pieces are narrowed at their centers to provide greater space between the bowed center portions thereof for tilting of the grippers.

A further object is to provide a one-way clutch in which an annular control spring lies within the concave bowed cross-pieces of the cage to be protected thereby.

The above and other objects and features of the invention will be more readily apparent from the following description when read in connection with the accompanying drawings, in which:

Figure 1 is a partial end elevation of a one-way clutch embodying the invention, with parts broken away and in section; Figure 2 is a developed plan view of the cage, and Figure 3 is a section on the line 3—3 of Figure 2.

The clutch as shown is adapted to connect a central shaft 10 with an outer cylindrical race 11. As illustrated, the shaft 10 carries an inner cylindrical race 12 coaxial with the race 11 and having rings 13 at its sides to hold the clutch assembly in place.

The clutch comprises a series of tiltable grippers 14 in annular array between the races. The grippers are preferably of the type having their ends curved about spaced centers so that when the outer race tends to turn counterclockwise relative to the inner race, the grippers will bind against the races to connect them, but when the outer race tends to turn clockwise the grippers will disengage the races for free relative rotation. Preferably each of the grippers has a central bore therethrough and an annular coil spring 15 is threaded through the bores and is bent thereby so that it tends to tilt the grippers counterclockwise toward their engaged position. This construction is more particularly described and claimed in my Patent No. 2,386,013.

The grippers are adapted to be held in properly spaced assembled relationship by means of a cage which is constructed, according to the present invention, of a single strip of thin material such as metal. As best seen in Figure 2, the strip is formed with a series of transversely extending elongated openings 16 which are wider in their central portions than adjacent their ends. Cross-pieces 17 are left between the openings and are narrower in their central portions than adjacent the edges of the strip. The ends of the openings are closed by relatively narrow edge portions 18, the inner edges of which are preferably straight in plan as seen in Figure 2.

The cross-pieces 17 are bowed radially to draw the edge portions 18 closer together than they lie with the strip in its flat condition, as best seen in Figure 3. Preferably the cross-pieces are bowed radially outward as there illustrated, and when so bowed draw the edge portions 18 together to a position in which they extend into grooves 19, extending across the ends of the grippers. Preferably the grooves 19 are wider than the thickness of the cage strip so that the grippers can tilt to a limited extent sufficient for normal clutching operation, but will engage the edge portions 18 to prevent excessive tilting.

To assemble the clutch the grippers are first threaded on to the spring 15 and the cage strip is bent into annular shape of the correct size for the clutch it is desired to assemble. The central parts of the crossbar 17 can then be pressed inward as, for example, by a compressible ring extending around the cage tending to straighten them so that the side edge portions 18 will be separated. With the ring in this condition the grippers can be inserted through the openings 16 from the inside of the cage so that the spring will lie in the concave bowed portions of the cross-members. Upon releasing the ring it will spring back to the condition shown in which bowing of the cross-members 17 draws the edge portions 18 into the notches or grooves 19. With the parts so assembled the grippers will be held against accidental disassembly from the cage, and tilting thereof will be limited so that the spring will not be damaged.

Alternatively to the method of assembly described above, the cage can be formed of a softer strip and the grippers can be assembled therein prior to bowing of the cross-pieces 17. After assembly of the grippers in the cage strip, pressure can be applied to the sides of the strip to cause the cross-pieces to bow outwardly and to press the edge portions 18 into the grooves 19 as illustrated.

While one embodiment of the invention has been shown and described in detail, it will be understood that the scope of the invention is not limited thereto or otherwise than by the terms of the appended claims.

What is claimed is:

1. A one-way clutch comprising a series of tiltable grippers in annular array adapted to be mounted between coaxial races, and having grooves in their ends, and a cage formed of a strip having edge portions joined by space cross strips to define openings therein through which the grippers extend and with the cross-strips lying between and separating the grippers, the cross-strips being bowed radially across the width of the strip to draw the edge portions of the strip at the ends of the openings into the grooves in the ends of the grippers, and being flexible so that the amount of bow can be reduced enough to permit the grippers to be inserted between the edge portions of the strip.

2. A one-way clutch comprising a series of tiltable grippers in annular array adapted to be mounted between coaxial races, and having grooves in their ends, and a cage formed of a strip having edge portions joined by space cross strips to define a series of elongated openings extending transversely thereof through which the grippers extend and with the cross-strips lying between and separating the grippers, the cross-strips being narrower in the central portion of the strip than adjacent to its edges and being bowed radially outward in its center to draw the edge portions of the strip at the ends of the openings into the grooves in the ends of the grippers.

3. A one-way clutch comprising a series of tiltable grippers in annular array adapted to be mounted between coaxial races, and having grooves in their ends, and a cage formed of a thin strip having edge portions joined by space cross strips to define transversely elongated openings therein through which the grippers extend and with the edge portions of the strip defining substantially straight ends for the openings, the cross-pieces of the strip between the openings being bowed radially to draw said edge portions loosely into the grooves in the ends of the grippers to limit tilting of the grippers.

4. A one-way clutch to fit between coaxial races comprising a series of tiltable grippers in annular array to fit between the races, an annular spring threaded through the grippers and bent thereby to urge the grippers to tilt in a direction to engage the races, and an annular cage formed of a thin strip having narrow edge portions joined by integral cross-pieces spaced to define openings through which the grippers extend, the grippers having grooves in their ends, the cross-pieces being bowed radially to draw the edge portions of the strip into the grooves, and the spring lying in the concave bowed portions of the cross-pieces.

5. A one-way clutch to fit between coaxial races comprising a series of tiltable grippers in annular array to fit between the races, an annular spring threaded through the grippers and bent thereby to urge the grippers to tilt in a direction to engage the races, and an annular cage formed of a thin strip having narrow edge portions joined by integral cross-pieces spaced to define openings through which the grippers extend, the grippers having grooves in their ends, the cross-pieces being narrower in the central portion of the strip than adjacent to its edges and being bowed radially outward to draw the edge portions of the strip into the grooves, the spring lying radially within the bowed cross-pieces.

CARL E. SWENSON.

References Cited in the file of this patent

UNITED STATES PATENTS

| Number | Name | Date |
|---|---|---|
| 2,366,843 | Dodge et al. | Jan. 9, 1945 |
| 2,386,013 | Swenson | Oct. 2, 1945 |